(12) United States Patent
Rosander et al.

(10) Patent No.: US 8,174,462 B2
(45) Date of Patent: *May 8, 2012

(54) SYSTEM AND METHOD FOR UPDATING ELECTRONIC LABEL DISPLAYS

(75) Inventors: Par Rosander, Uppsala (SE); Lars Andersson, Uppsala (SE); Bjorn Nilsson, Jarlasa (SE)

(73) Assignee: Pricer AB, Sollentuna (SE)

( * ) Notice: Subject to any disclaimer, the term of this patent is extended or adjusted under 35 U.S.C. 154(b) by 407 days.

This patent is subject to a terminal disclaimer.

(21) Appl. No.: 12/466,434

(22) Filed: May 15, 2009

(65) Prior Publication Data

US 2009/0219223 A1    Sep. 3, 2009

Related U.S. Application Data

(63) Continuation of application No. 10/506,108, filed as application No. PCT/SE03/00336 on Feb. 27, 2003, now Pat. No. 7,551,149.

(60) Provisional application No. 60/359,985, filed on Feb. 28, 2002.

(51) Int. Cl.
*G09G 5/00* (2006.01)

(52) U.S. Cl. .......................................... 345/2.3; 705/20

(58) Field of Classification Search ............ 345/1.1–2.3, 345/173; 235/383; 705/20
See application file for complete search history.

(56) References Cited

U.S. PATENT DOCUMENTS

| | | |
|---|---|---|
| 5,382,779 A | 1/1995 | Gupta |
| 5,797,132 A | 8/1998 | Altwasser |
| 5,918,212 A | 6/1999 | Goodwin, III |
| 5,977,998 A | 11/1999 | Briechle et al. |
| 6,089,453 A | 7/2000 | Kayser et al. |
| 6,269,342 B1 | 7/2001 | Brick et al. |
| 6,597,329 B1 | 7/2003 | Moss |
| 7,551,149 B2 * | 6/2009 | Rosander et al. ............. 345/2.3 |
| 2001/0020935 A1 | 9/2001 | Gelbman |
| 2002/0022978 A1 | 2/2002 | Schiff et al. |

FOREIGN PATENT DOCUMENTS

| | | |
|---|---|---|
| EP | 0228377 B2 | 11/1995 |
| EP | 0994431 A2 | 4/2000 |
| JP | 2001-157284 | 6/2001 |
| JP | 2001-186506 | 7/2001 |
| WO | WO 86/02477 A1 | 4/1986 |
| WO | WO 00/41161 A1 | 7/2000 |
| WO | WO 02/05058 A2 | 1/2002 |
| WO | WO 02/05171 A1 | 1/2002 |

OTHER PUBLICATIONS

Extended European Search Report and search opinion dated Apr. 21, 2020 for European Application No. 10153333.9.
International Search Report for PCT Application No. PCT/SE03/00336 dated May 14, 2003.

* cited by examiner

*Primary Examiner* — Kimnhung Nguyen
(74) *Attorney, Agent, or Firm* — Jones Day

(57) ABSTRACT

An electronic label wirelessly connected to an information updating system having a server. The electronic label includes a wireless communication interface to receive information from the server to be displayed on a display, a means for label processing connected to the communication interface, a means for updating the display connected to the means for label processing, and at least one dot matrix display to display a dot matrix image, where the dot matrix display is connected to the means for updating the display. The communication interface receives the information to be displayed from the information updating system. The label includes a layout script such that the means for label processing generates the dot matrix image from the received information using the layout script.

40 Claims, 4 Drawing Sheets

| Item 1 | price 1 |
|---|---|
| Item 2 | price 2 |
| Item 3 | price 3 |
| Item 4 | price 4 |

Fig. 5a

| Item 1 | price 1 |
|---|---|
| Item 3 | price 3 |
| Item 4 | price 4 |

Fig. 5b

| Item 1 | price 1 |
|---|---|
| Item 3 | price 3 |
| Item 4 | price 4 |

Fig. 5c

SYSTEM AND METHOD FOR UPDATING ELECTRONIC LABEL DISPLAYS

CROSS-REFERENCE TO RELATED APPLICATIONS

This application is a continuation of U.S. application Ser. No. 10/506,108, now U.S. Pat. No. 7,551,149, which is the National Stage application of International Application No. PCT/SE03/00336 filed on Feb. 27, 2003, which claims the benefit of U.S. Provisional Application No. 60/359,985 filed on Feb. 28, 2002. The entire contents of all applications are incorporated herein by reference.

TECHNICAL FIELD OF THE INVENTION

The present invention relates to an electronic label according to the preamble of claim 1.

It also relates to a server in an electronic product information updating system according to the preamble of claim 8.

Furthermore it relates to a method for updating an electronic label according to the preamble of claim 11.

BACKGROUND OF THE INVENTION

An electronic price label, a server and a method for updating the price label is described in for example EP 0228377.

In an electronic price updating system like this, price labels are attached to for example the shelves in the store or nearby a product bin. The price labels comprise components for wireless communication with a price data base. Each time there is a price change for a product this is communicated out to the price label for this product and the price shown on the display in the price label is changed. Normally LCDs are used as displays.

In US 2002/0020935 an electronic price label system is described where a dot matrix display is used in the price label. When a dot matrix display is used instead of a segment based display better resolution in the displayed image is achieved.

A problem with a wireless price label system using dot matrix displays is that the updating of the displays takes long time and a lot of power is required leading to a short lifetime. Price labels with low power consumptions are preferred.

SUMMARY

An object of the invention is to provide an electronic label with high resolution and low power consumption.

One embodiment of the present invention is directed to an electronic label that is wirelessly connected to an information updating system that includes a server. The electronic label includes a wireless communication interface that receives information from the server to be displayed on a display, a means for label processing that is connected to the communication interface, a means for updating the display that is connected to the means for label processing, and at least one dot matrix display, which is connected to the means for updating the display and which displays a dot matrix image. The communication interface receives information to be displayed from the information updating system. Additionally, the label comprises a layout script such that the means for label processing generates the dot matrix image from the received information using the layout script.

Another embodiment of the present invention is directed to a method of updating at least one electronic label, which includes a dot matrix display. The method includes the steps of (i) receiving updated product information from a server that is wirelessly connected to the at least one electronic label, (ii) transmitting the updated information to the at least one label, and (iii) updating the dot matrix display according to the received updated information with a means for label processing using a layout script.

A further embodiment of the present invention is directed to an information updating system that comprises at least one database, a server, and an electronic label. The server includes a means for server processing, a communication interface connected to the means for server processing, a means for receiving updated information from the database, and a means for storing information displayed on the label. The electronic label includes a wireless communication interface that receives information from the server to be displayed on the label, a means for label processing that is connected to the communication interface, a means for updating the display that is connected to the means for label processing, and at least one dot matrix display, which is connected to the means for updating the display and which displays a dot matrix image. The communication interface receives information to be displayed from the information updating system. Additionally, the label comprises a layout script such that the means for label processing generates the dot matrix image from the received information using the layout script.

With this electronic label, information updating system and method, a system is achieved where only parts of the display content are sent to the electronic label for updating. Hence, the updating procedure takes less time than if the entire display image was sent. Therefore, the label needs to be turned on a for less time, resulting in a lower power consumption and longer battery life. Preferably, the battery life is very long in this kind of product and may be equal to the life of the product itself.

Further advantageous embodiments of the present invention are set out in the dependent claims.

BRIEF DESCRIPTION OF THE DRAWINGS

FIG. 5 shows a dot matrix display according to the invention where the information for several products is shown on the same label.

DETAILED DESCRIPTION OF EMBODIMENTS

The electronic label according to the invention is a label showing different information of a product. Often, but not necessarily always, the price of the product is included in this information. Therefore the label is called a price label hereafter in this description. However, other information than price could also be shown on the label and be updated from the updating system.

Figure 1:
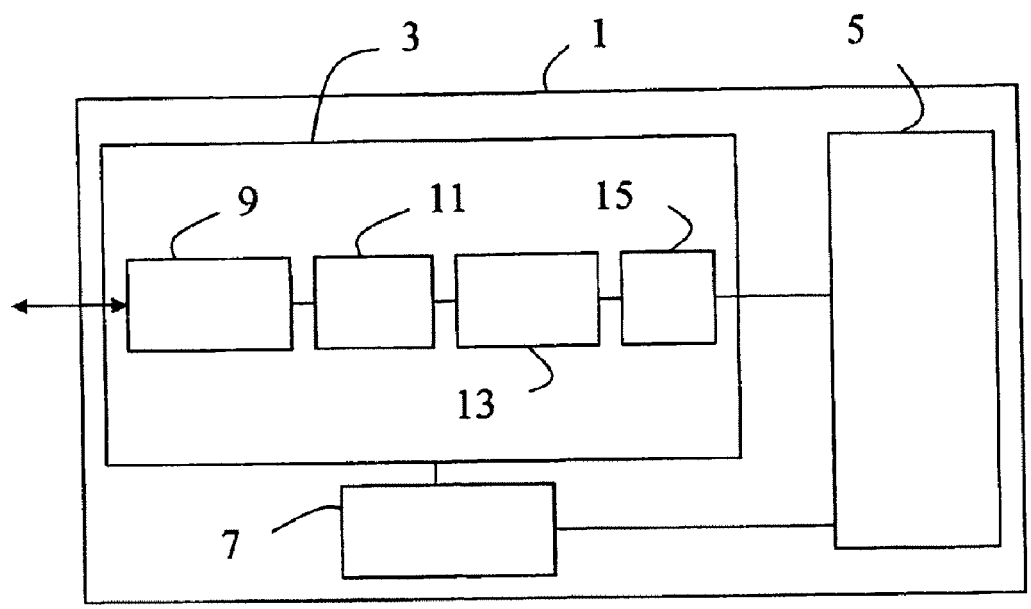
FIG. 1 is a schematic view of an electronic label according to the invention.

FIG. 1 is a schematic view of a price label 1 according to the invention. It comprises a microprocessor 3, a dot matrix display 5 connected to the microprocessor 3 and a power source 7 giving power to the microprocessor 3 and the display 5. The microprocessor 3 comprises a communication interface 9 which is adapted to communicate, preferably wirelessly with a server in the product information updating system. A wireless communication using for example IR or radio is preferred. The server is actually connected, wirelessly or via cable, to at least one transceiver that is adapted to receive and transmit data wirelessly to and from a plurality of price labels. The communication interface 9 is according to the invention adapted to receive updated information from the server and also positioning information about where in the dot matrix display this information should be shown. The updated information is usually a new price for the product related to this specific price label but it could also be other kinds of product information that should be updated.

Figure 4A:
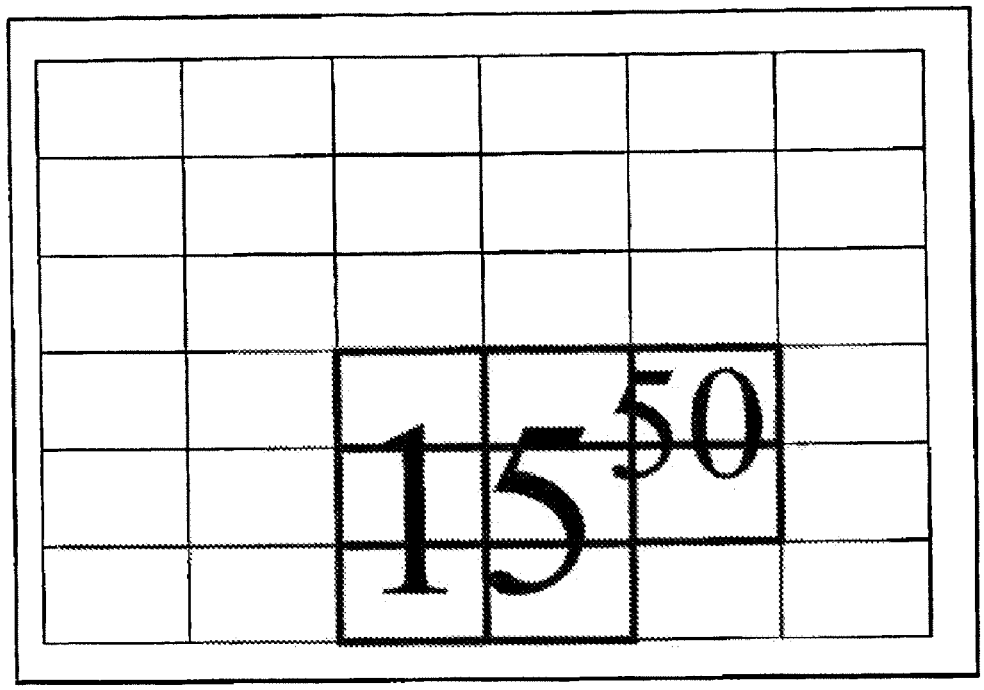
FIGS. 4*a* and *b* show methods for deriving position information.

There are different possibilities of how to indicate where in the dot matrix display the updated information should be shown. FIG. 4a and b show methods for deriving position information.

FIG. 4a shows a method where a grid is defined on the display. The same grid, i.e. a grid with the same sizes and positions of the grid elements, is also known in the server and as described below the server comprises means for comparing the updated information with the displayed image and the grid and define which grid elements in the grid that comprises updated information and thus need to be updated. Therefore, only the grid elements that need to be updated in the dot matrix display of the price label are communicated to the price label from the server. Furthermore position information about the position in the grid of these grid elements is communicated to the price label. In the example shown in FIG. 4a, 8 grid elements need to be sent if the price 15.50 is to be updated to 26.95 for instance. Each part is individually identified by both the server and the display module. Hereby the server needs to store all the images displayed on the price labels connected to this server as will be further described below.

Figure 4B:
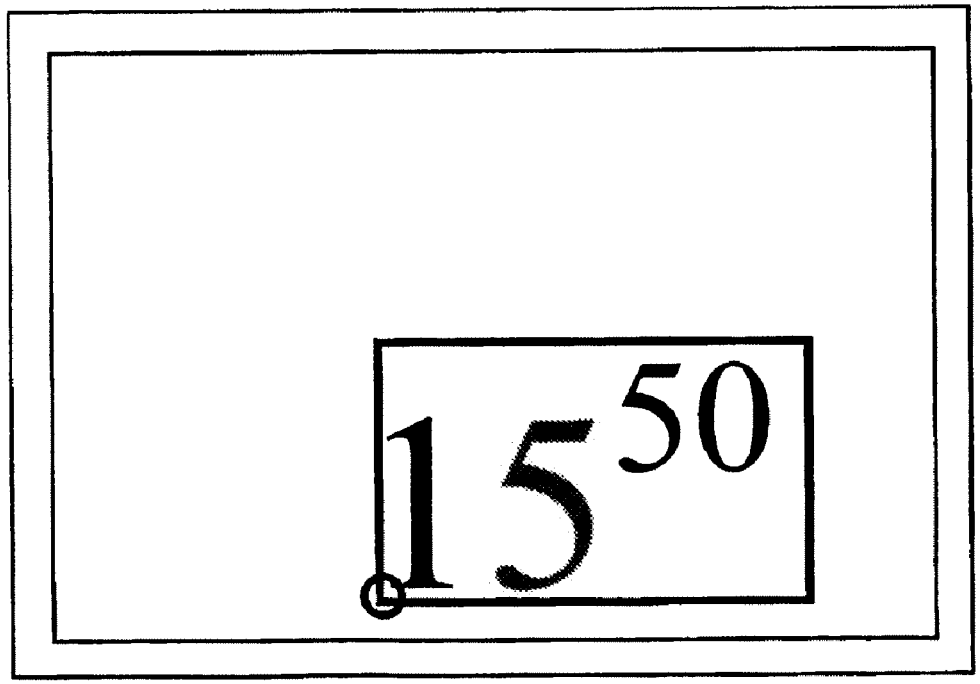

Another possibility, shown in FIG. 4b, is to define the position for the updated information in the server by comparing the updated information with the stored display image. Also the size of the updated part of the display image should be determined. This position information comprises position and size in the display image for the updated information and should be sent to the price label together with the updated information.

In the example shown in FIG. 4b, 15.50 shall be updated to for example 16.95. Then the following area should be selected by the server. Reference point (horizontal dot number a, vertical dot number b) as marked by circle. Update area size (x dots height and y dots width) as marked by a small square. The server sends at least the following information to the display module [a,b,x,y,data] were data is the image content of square x*y.

With reference to FIG. 1 again, the microprocessor 3 further comprises a processing means 11 connected to the communication interface 9. This processing means 11 is adapted to process the received information. The processing means 11 is adapted to process the position information and relate this to the image displayed on the dot matrix display. This image is also stored in a storing means 13 connected to the processing means 11. The processing means 11 is adapted to store the received updated information in the correct position of the image in the storing means 13 according to the position information. Furthermore, in one embodiment of the invention, the processing means 11 is adapted to decompress the received updated information since in this embodiment the information was compressed in the server. Compression of the information would save sending and receiving capacities as well as battery lifetime.

As to the generation of an image adapted to be shown on the dot matrix display this could either be performed in the server using a layout script as will be described below or in the price label itself. The updated information received in the server from a price data base comprises only text, for example as ASCII code, and need to be transferred to an image. If the image generation is performed in the price label the processing means 11 performs this by using a layout script. An image is thus generated according to preset definitions in the layout script. These definitions typically relate to size and font of the text and to the positions in the display at which the various text parts should be located. This layout script can be updated from the server. Hereby it is possible to change the layout of the display images, for example size and font of the text, from the server.

Furthermore the microprocessor 3 comprises a display updating means 15 connected to the storing means 13 and to the dot matrix display 5. The display updating means is in one embodiment adapted to update the complete display 5 according to the content in the storing means 13 each time a change of its content occurs. In another embodiment the display updating means 15 is adapted to update only the parts of the dot matrix display 5 that will be changed. However, in the latter case it is preferred that the complete display is updated regularly. The reason is that if the display is a bistable display the image will slowly degenerate and it needs to be updated regularly. A bistable display is preferred since in such a display power is only needed during the updating of the display. This will save battery lifetime.

If only the part of the display that will be changed should be updated, i.e. the second variant mentioned above. The processing means 11 could be connected directly to the display updating means 15 and the display is simply updated each time updated information has been received. In a further embodiment of the invention the storing means comprises more than one display image. Different display images are stored giving the possibility to change image on the display. The price label could be provided with a button or the like for the user to press for changing the display image. The store staff could for example need to see some other information about the product, such as storage status or other product related information.

Figure 2:
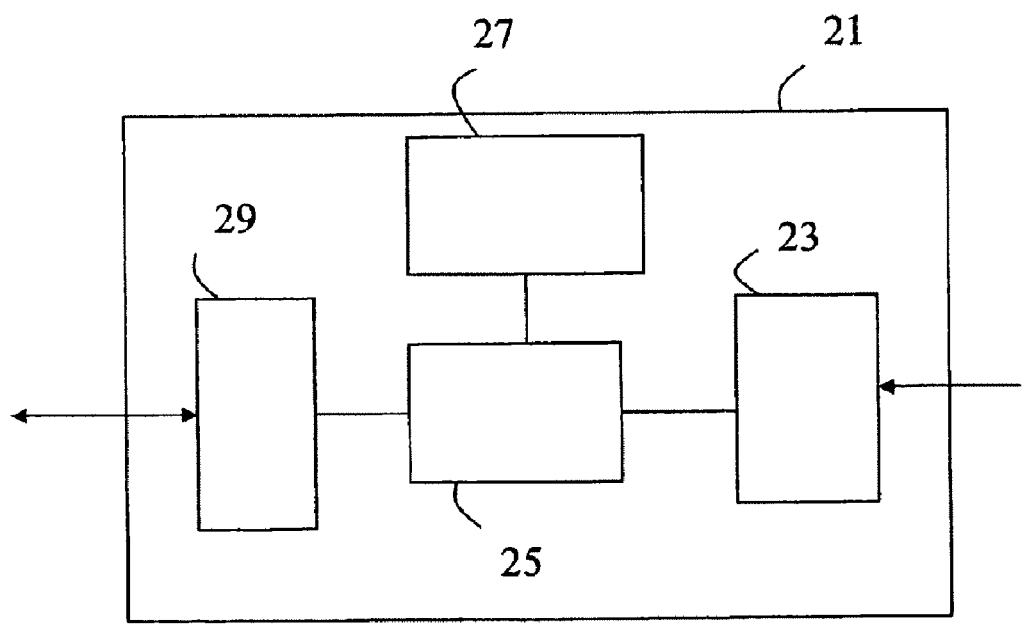
FIG. 2 is a schematic view of a server adapted to communicate wirelessly with labels according to the invention.

FIG. 2 is a schematic view of a server 21 adapted to communicate wirelessly, for example via IR or radio, with price labels according to the invention. The server is connected to for example a cash register and data bases comprising information that can be updated in the price labels. Normally the server is placed in a computer that also could comprise for example the cash register in a store. Price changes and other updated information is received in a receiving means 23 in the server 21 from for example a price data base. The server comprises also a processing means 25 adapted to process the received information. If the image should be generated in the server 21 and not in the price label 1 the processing means 25 is adapted to generate an image adapted to be shown on the dot matrix display of the price label related to this product, i.e. the price label (or labels) showing the information of the product for which updated information was received. The received updated information is for example received as coded text, for example ASCII coded. For generating an image from this text a layout script is used as described above.

Furthermore the processing means 25 is adapted to compare the received updated information with a stored image that is identical to the image shown on the price label showing the information that should be changed. Thus a storing means 27 is provided in the server 1. This storing means 27 is connected to the processing means and comprises all the images shown on the price labels connected to this server 21. An alternative to storing all the display images is that the server easily can regenerate the image from parameters stored in the server using the layout script. The processing means 25 compares the received updated information with the stored image for this product and relates the updated information to a position according to one of the possibilities described above, i.e. a predefined grid or just a position definition together with a size. The processing means 25 forwards the generated image, or the received updated information if the image generation is performed in the price label instead, together with the position information to the communication interface 29.

The processing means 25 comprises also a register of which price labels that are related to which products. Thus the processing means 25 can choose the right image from the storing means 27 for the comparison. The updated information together with position information is also given the right address when sending it to the price label. Thus the processing means 25 is also adapted to give the information an address to be sent to. In one embodiment of the invention the processing means 25 is also adapted to compress the information before sending it. This could be performed by using a suitable method for compression.

The communication interface 29 is adapted to send the updated information together with the position information to the price label having the address given by the processing means 25.

The processing means 25 in the server is further adapted to store the new, updated image in the storing means 27 such that the images in the storing means 27 always are updated and correspond to the images shown on the price labels.

In one embodiment of the invention the image displayed on the dot matrix display is divided into two parts, a background image part and a front image part. The background image part comprises all the information that probably does not need to be updated often, such as for example the product description, picture and logo. The background image part is thus more or less static and it is stored in the storing means 13 in the price label. The front image part comprises the information that will be updated regularly, such as for example the price. In this embodiment the server only sends the front image part with updated information to the price label. The processing means 11 in the price label 1 processes the received information and the display updating means 15 combines this new front image part to the old background image part according to preset definitions. One possibility is that the display is separated into two parts where one part is dedicated for the background image part and the other part is dedicated for the front image part. In this case the old front image part is replaced by the new front image part. Otherwise the two image parts are merged together according to preset definitions. Sometimes the background part maybe also need to be updated. This is performed in the same way as other information is updated according to this invention.

According to what has already been described above the front image part could either be generated as a dot matrix image in the server or it could be sent as coded text, for example ASCII code, to the price label where the generation of the image in this case is performed in the processing means 11.

According to one embodiment of the invention it is also possible to show color images on the dot matrix display. To send a color image and to process it in the price label requires much more resources than sending and processing a monochrome image. One possibility to be able to use color images without the need of an excess amount of resources is to use a cholosteric LCD as display. In this type of display it is common to stack two LCDs of different colors over each other. This gives a display where each pixel can have one of four different colors. The colors are dependent on the colors of the two LCDs but if one LCD is green and the other is red a pixel where only the red display is "turned on" is red, a pixel where only the green display is "turned on" is green, a pixel where both the displays are turned on is black and a pixel where none of the displays are turned on is white. This type of display requires only two bits per pixel for color information.

Another possibility to show color images on the price label without the need of too much resources is to use a color template in the price label. This color template comprises information of which color that should be used in which part of the image shown on the dot matrix display. In most cases it would not be necessary to change colors for the different parts of the display and then this technique with a color template is a good alternative to a full color image. Hereby a monochrome image or monochrome information is sent from the server to the price label and the monochrome image is combined with the color template when the display is updated. Thus the dot matrix image shown on the display can have different colors. The color template could also be updated in the same way as other information is updated according to this invention, i.e. updated information together with position information is sent from the server to the price label. For example the color could be changed to red, when a sale price is displayed. This coloring method can be used for 2 colors (requiring a 1 bit color template), 4 colors (requiring a 2 bit color template) et cetera. Furthermore a means for converting the color information into a format used in the display is needed. For example, if the display is a display with 4 bit per pixel and the color template is a 2 bit color template, a translation from 2 bit color to 4 bit color is needed is needed in the price label. However, in this case it might be better to use a 4 bit color template and thus eliminate the need of translation processing in the price label. All processing in the price label consumes power, translation as well as communication, so it is a tradeoff between communication speed and power consumption as well as how many bits color the LCD takes that sets the optimal color template to use.

Each price label must have an address for identification. Furthermore each price label need to be linked to the product it is related to. Today it is common to provide each price label with a sticker comprising the bar-code of the product and a bar-code identifying the address of the price label.

To be able to use a dot matrix sign in a retail environment the product intended to be displayed on the sign must be connected to the sign. This procedure is known as linking the product to the sign.

The dot matrix price label contains a dot matrix price label identification, a description of the product displayed on the display, and identification of this product.

Price label identification can be a printed bar-code, preferably attached on the backside of the product. Alternatively it can be a memory in the label that is accessible with a hand held device using wireless communication like RFID, IR, Radio et cetera. It could also be presented as a bar-code or in another way at the display enabling a bar code scanner or similar to scan it.

The product description can be a printed paper overlay that is attached to the label. For a common segment based display showing only the price this paper overlay is needed for the customers to know what item the price is shown for. When linking off the product this label must also be removed and a new one be attached for the new item to be displayed. However, using a dot matrix display, as in this invention, the use of a paper overlay can be avoided. All functions connected to the paper label overlay can now be handled using the memory and the display. The product description is as described above shown on the label display.

Product identification can be a printed bar-code, often on the same sticker as the product description if such a sticker is used. Alternatively it can be a memory in the label that is accessible with a hand held device using wireless communication like RFID, IR, Radio et cetera. It could also be presented as a bar-code or in another way at the display enabling a bar code scanner or similar to scan it.

A dot matrix price label is also possible to use as a menu sign. This means that several items (products) are shown on the same label (sign). This price label requires new functions regarding the linking process. The obvious is that it has to be possible to relate (link) one sign to several items. In more detail the system creating the picture to be shown on the display must have functions for arranging the information of the items as wanted. See for example in FIG. 5, where a menu sign according to the invention is shown. In FIG. 5*a* four items are linked to the menu sign and shown on the display, i.e. their names and their prices are shown. In FIG. 5*b* the second of these items has been removed from the list, i.e. been linked off from these menu sign. Therefore a row in the middle of the sign is empty. In FIG. 5*c* the two items under the empty row are automatically moved up one row each to fill empty row. In more general terms, several items are listed with their prices. If an item, which has a place in the middle of the list, is linked off, i.e. should not be related to this label (sign) anymore, the items after this item in the list should all be moved up one row in order not to have empty rows in the item list. Consequently it should be possible to position a newly linked item in the middle of the item list and items after the new item should then be moved down one row. Preferably the system comprises a method for checking that not too many items are linked to the menu sign. When the display is full, for example when all the rows in the list shown in FIG. 5 are occupied, an error message should be sent to the user trying to link another item to this menu sign. The server shall preferably have a memory containing information about all the images currently shown on the menu signs in order for the store personal to see all menu signs when linking on items to a menu sign or linking off items from the menu sign.

Bar-codes are usually one-dimensional (1D) consisting of thick or thin lines, preferably black, separated by thick or thin fields of background, preferably white. There also exist two-dimensional (2D) bar-codes that can be described as several one dimensional bar-codes stacked on each other, these bar-code can retain a lot more information than the one-dimensional bar-codes.

Thus, in a price label comprising a dot matrix display according to the invention it is possible to provide the bar-codes in the display image instead for bar-codes on stickers. Hereby the bar-codes do not have to be changed manually. Instead everything can be managed from the server. For example when a price label is moved and should show the price for another product the new bar-code is provided from the server to the price label as updated information according to what has been described above.

Furthermore it is possible to use RFID (Radio Frequency Identification) recorded by radio as identification means instead of bar-codes. It would also be possible to read the identification of the price label and the related product through a wireless communication interface, for example IR or radio. This requires that the communication interface and the processing means in the label have functionality to receive requests for transmitting label ID and functionality to transmit the label ID to the device that requested it. (The device here is suitably a hand held unit used most often by the store personal).

Figure 3:
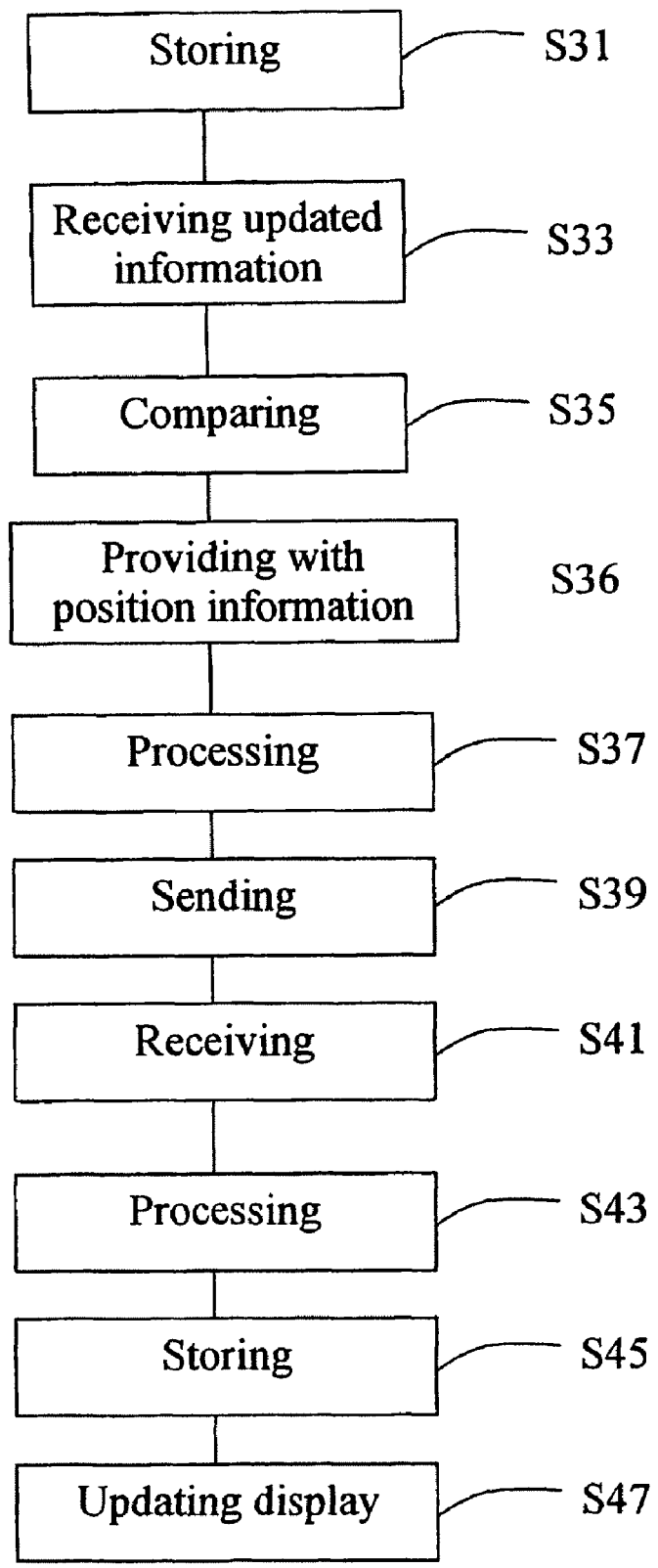
FIG. 3 is a flowchart of the process for updating labels according to the invention.

FIG. 3 is a flowchart of the process for updating price labels according to the invention. The different steps of the method are described in order below:

S31: Storing in a server all different display images present in the price labels communicating with this server.

S33: Receiving in the server updated information for a product from for example a price data base connected to the server. The updated information is for example a new price for a product.

S35: Comparing in the server the updated information with the display image for this product. A register where it is shown which product each price label is related to is present in the server. Thus the server can find the correct image to be compared with the updated information. This comparison will show where in the image the updated information should be placed.

S36: Providing the updated information with a position information. In one embodiment the price label display is divided into a grid. The server has also knowledge about this grid and from the comparison the server can derive which ones of the squares in the grid that should be updated. Thereafter only the squares that should be updated are communicated to the price label together with a position information of which grid squares in the image that should be replaced. In another embodiment the server compares the updated information with the display image and derives a position and a size of the information that should be replaced. This position information is communicated together with the updated information to the price label as discussed above.

S37: Processing the updated information according to preset definitions. The processing could include to generate an image from the received updated information by using a layout script as described above. In one embodiment the information is also compressed before it is sent to the price label. Furthermore the information is given the right address.

S39: Sending the processed updated information together with the position information to the price label (or labels) that is showing the price for this product.

S41: receiving the updated information and the position information in the price label.

S43: possibly decompressing the information if it was compressed in the server and then processing the position information and possibly also generating an image from a coded text as described above.

S45: storing the updated information in the storing means in the price label according to the position information.

S47: updating the display. Preferably the whole display is updated if a bistable display is used as discussed above.

The invention claimed is:

1. An electronic label wirelessly connected to an information updating system including a server, the electronic label comprising:
   a wireless communication interface to receive information from the server to be displayed on a display;
   a means for label processing connected to the communication interface;
   a means for updating the display connected to the means for label processing; and
   at least one dot matrix display to display a dot matrix image, wherein the dot matrix display is connected to the means for updating the display,
   wherein the communication interface receives the information to be displayed from the information updating system, wherein the label comprises a layout script, and
wherein the means for label processing generates the dot matrix image from the received information using the layout script.

2. The electronic label according to claim 1, wherein the label receives the information as plain text.

3. The electronic label according to claim 1, wherein the label receives the information as coded data.

4. The electronic label according to claim 1, wherein the display is a bistable dot matrix display.

5. The electronic label according to claim 1, wherein the layout script is updated by the server.

6. The electronic label according to claim 1, wherein the means for label processing decompresses compressed information received from the server.

7. The information updating system according to claim 1, wherein the electronic label is wirelessly connected to the server, directly or via a transceiver. and is updated by the server, the server comprising a means for server processing and a communication interface connected to the means for server processing, wherein the communication interface transmits updated information to the label, and wherein the means for label processing uses the layout script to generate a dot matrix image displaying the updated information.

8. The information updating system according to claim 7, wherein the server further comprises a means for receiving updated information from at least one connected database, wherein the means for server processing is connected to the means for receiving updated information and processes the received updated information.

9. The information updating system according to claim 7, wherein the server further comprises a means for storing information shown on the label, and wherein the means for storing information shown on the label is connected to the means for server processing.

10. The information updating system according to claim 7, wherein the server transmits the updated information as plain text.

11. The information updating system according to claim 7, wherein the server transmits the updated information as coded data.

12. The information updating system according to claim 7, wherein the server compresses the updated information and transmits the updated information as compressed data, and wherein the label decompresses the compressed data.

13. The information updating system according to claim 7, wherein the server updates the layout script in the label.

14. The electronic label according to claim 1, wherein the communication interface receives from the updating system only part of the image that has been updated together with information about where the display image updated information should be placed, and wherein the means for updating the display updates the display accordingly.

15. A method of updating at least one electronic label having a dot matrix display comprising the steps of:
receiving updated product information from a server that is wirelessly connected to the at least one electronic label;
transmitting the updated information to the at least one label; and
updating the dot matrix display according to the received updated information with a means for label processing using a layout script.

16. The method according to claim 15, further comprising the step of compressing the updated information in the server and decompressing the updated information in the at least one label.

17. The method according to claim 15, further comprising the step of updating the layout script in the at least one label from the server.

18. The method according to claim 15, wherein the dot matrix display displays a price of a product.

19. The method according to claim 15, wherein the dot matrix display displays a promotional message.

20. The method according to claim 15. wherein the dot matrix display displays a product description.

21. The method according to claim 15, wherein the dot matrix display displays a barcode.

22. The method according to claim 15, wherein the dot matrix display displays information about more than one product.

23. The method according to claim 22, wherein the information is displayed as a list of products linked to the label, and wherein the list has a length that dynamically changes based on the number of products linked to the label.

24. The method according to claim 15, wherein the dot matrix display is a color display.

25. The method according to claim 15, wherein the display is a bistable dot matrix display.

26. The method according to claim 15, wherein the transmitting step further comprises:
transmitting position information in the display for the updated information; and
updating the display according to the received updated information and the position information.

27. An information updating system comprising:
at least one database;
a server comprising:
a means for server processing;
a communication interface connected to the means for server processing;
a means for receiving updated information from the at least one database; and
a means for storing information displayed on the label; and
an electronic label comprising:
a wireless communication interface to receive information from the server to be displayed on the label;
a means for label processing connected to the communication interface;
a means for updating the display connected to the means for label processing; and
at least one dot matrix display to display a dot matrix image, wherein the dot matrix display is connected to the means for updating the display,
wherein the communication interface receives the information to be displayed from the information updating system,
wherein the label comprises a layout script, and
wherein the means for label processing generates the dot matrix image from the received information using the layout script.

28. The information updating system according to claim 27, wherein the electronic label receives the information as plain text.

29. The information updating system according to claim 27, wherein the electronic label receives the information as coded data.

30. The information updating system according to claim 27, wherein the display is a bistable dot matrix display.

31. The information updating system according to claim 27, wherein the layout script is updated by the server.

32. The information updating system according to claim 27, wherein the means for label processing decompresses compressed information received from the server.

33. The information updating system according to claim 27, wherein the electronic label is wirelessly connected to the server, directly or via a transceiver, and is updated by the server, the server comprising a means for server processing and a communication interface connected to the means for server processing, wherein the communication interface transmits updated information to the label, and wherein the means for label processing uses the layout script to generate a dot matrix image displaying the updated information.

34. The information updating system according to claim 33, wherein the server further comprises a means for receiving updated information from at least one connected database, wherein the means for server processing is connected to the means for receiving updated information and processes the received updated information.

35. The information updating system according to claim 33, wherein the server further comprises a means for storing information shown on the label, and wherein the means for storing information shown on the label is connected to the means for server processing.

36. The information updating system according to claim 33, wherein the server transmits the updated information as plain text.

37. The information updating system according to claim 33, wherein the server transmits the updated information as coded data.

38. The information updating system according to claim 33, wherein the server compresses the updated information and transmits the updated information as compressed data, and wherein the label decompresses the compressed data.

39. The information updating system according to claim 33, wherein the server updates the layout script in the label.

40. The electronic label according to claim 27, wherein the communication interface receives from the updating system only part of the image that has been updated together with information about where the display image updated information should be placed, and wherein the means for updating the display updates the display accordingly.

* * * * *